S. H. NEWMAN.
CLOSET SEAT.
APPLICATION FILED APR. 13, 1921.
1,408,903.
Patented Mar. 7, 1922.
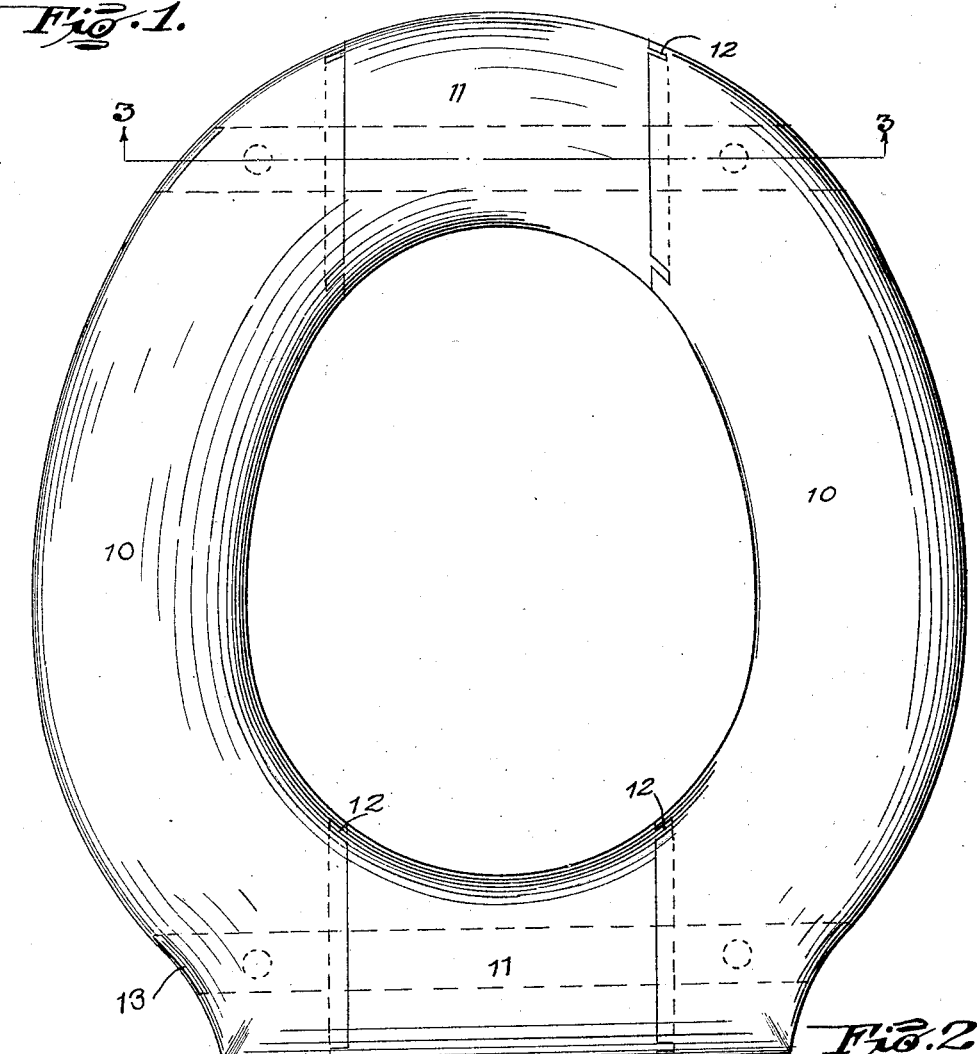
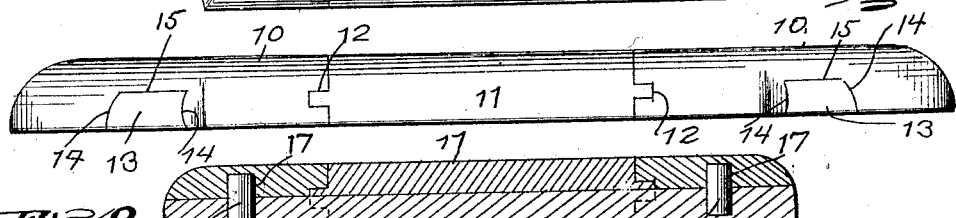
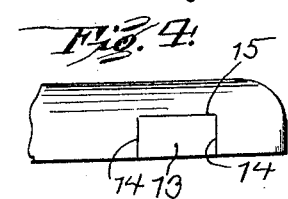
Inventor
Samuel H. Newman.
By Watson E. Coleman
Attorney

UNITED STATES PATENT OFFICE.

SAMUEL H. NEWMAN, OF ALGOMA, WISCONSIN.

CLOSET SEAT.

1,408,903.  Specification of Letters Patent.  Patented Mar. 7, 1922.

Application filed April 13, 1921. Serial No. 461,124.

*To all whom it may concern:*

Be it known that I, SAMUEL H. NEWMAN, a citizen of the United States, residing at Algoma, in the county of Kewaunee and State of Wisconsin, have invented certain new and useful Improvements in Closet Seats, of which the following is a specification, reference being had to the accompanying drawings.

This invention relates to improvements in closet seats and has for an object thereof the provision of a seat of this character the joints of which cannot open up when the seat is subjected to dampness.

A further object of the invention is to provide a wooden seat of this character the grain of which seat extends in a direction longitudinally of the seat.

As is well known to those familiar with the art, seats of this character are subjected to considerable side strain tending to split the same, and in an endeavor to overcome this splitting and still provide a seat the grain of which extends in one direction, the seats have been doweled and otherwise secured together. The dowel structure has been found to be unsatisfactory as the dowels break easily permitting the seat to split. The same is true of inserted strips, as where the strip is inserted in the seat it provides at both sides thereof layers of the wood which are very thin and which accordingly break easily.

In accordance with my invention the above difficulties are overcome by the provision of a relatively broad, flat strip which is let into the bottom of the seat, the strip being provided adjacent the ends thereof with upstanding dowels extending nearly but not quite through the wood of the seat. These dowels prevent transverse swelling and splitting of the seat, and the broad surface afforded by the strip provides sufficient gluing surface to permit of the sections of the seat being very solidly secured together.

Other objects and advantages of the invention will become apparent throughout the course of the following description.

In the accompanying drawings, wherein for the purpose of illustration is shown a preferred embodiment of my invention and wherein like reference characters designate like parts throughout:

Figure 1 is a plan view of a seat constructed in accordance with my invention;

Figure 2 is an end elevation thereof;

Figure 3 is a section on the line 3—3 of Figure 1; and

Figure 4 is a fragmentary side elevation thereof.

Referring now more particularly to the drawings, the numeral 10 indicates side sections of the seat, and the numeral 11 central sections which are secured to the side sections by tongue and groove joints 12, or some similar arrangement, the grain of the sections 10 and 11 extending in substantially the same direction. While I have described the seat as being composed of sections in the usual manner of constructing closet seats, it will of course be understood that if desired the seat may be formed from a single piece of wood, the grain in either case extending longitudinally of the seat.

At the forward and rear ends of the seat, strips 13 are let into the bottom thereof and preferably extend entirely across the seat. These strips are of considerable width and have the sides 14 and tops 15 thereof preferably flat in order to provide a smooth, even gluing surface. To the strips, adjacent the ends thereof and more particularly to those portions of the strips underlying the sections 10 of the seat, I secure dowels 16 extending into the material of the side sections of the seat, or in the case of an integral seat, into the material of the seat adjacent the sides thereof, the seat being provided with suitable bores 17 for the reception of the pins.

It will be obvious that the broad, flat surface afforded by the strips 13 will allow of sufficient surface to insure of proper cohesion of the seat sections and the strip when the same is glued in position, and it will likewise be obvious that the dowel 16 will effectually prevent spreading and separation of the sections thereof. The grain of the strips 13 will of course extend longitudinally thereof.

Many changes being possible in the shape, size and arrangement of the various parts of my seat as hereinbefore set forth, I do not limit myself to the specific structure hereinbefore disclosed except as hereinafter claimed.

What I claim is:

1. A closet seat provided in the under surface adjacent each end thereof with a transverse groove opening on the under face of the seat, batten strips seated within the grooves and glued to the walls thereof, and dowels carried by said batten strips adjacent the ends thereof and extending into the material of the seat at the upper surface of the grooves and adjacent the sides of the seat.

2. A closet seat comprising side sections and middle sections disposed intermediate the ends of said side sections, transversely extending grooves formed in the under surface of each of said central sections, grooves formed in the under surface of said side sections combining with the grooves of said central sections to form transversely extending channels at each end of the seat, batten strips seated in said channels and glued to the walls thereof, and dowels carried by each of said batten strips and engaging in the material of the side sections at the upper surface of the grooves.

In testimony whereof I hereunto affix my signature.

SAMUEL H. NEWMAN.